Patented Jan. 16, 1951

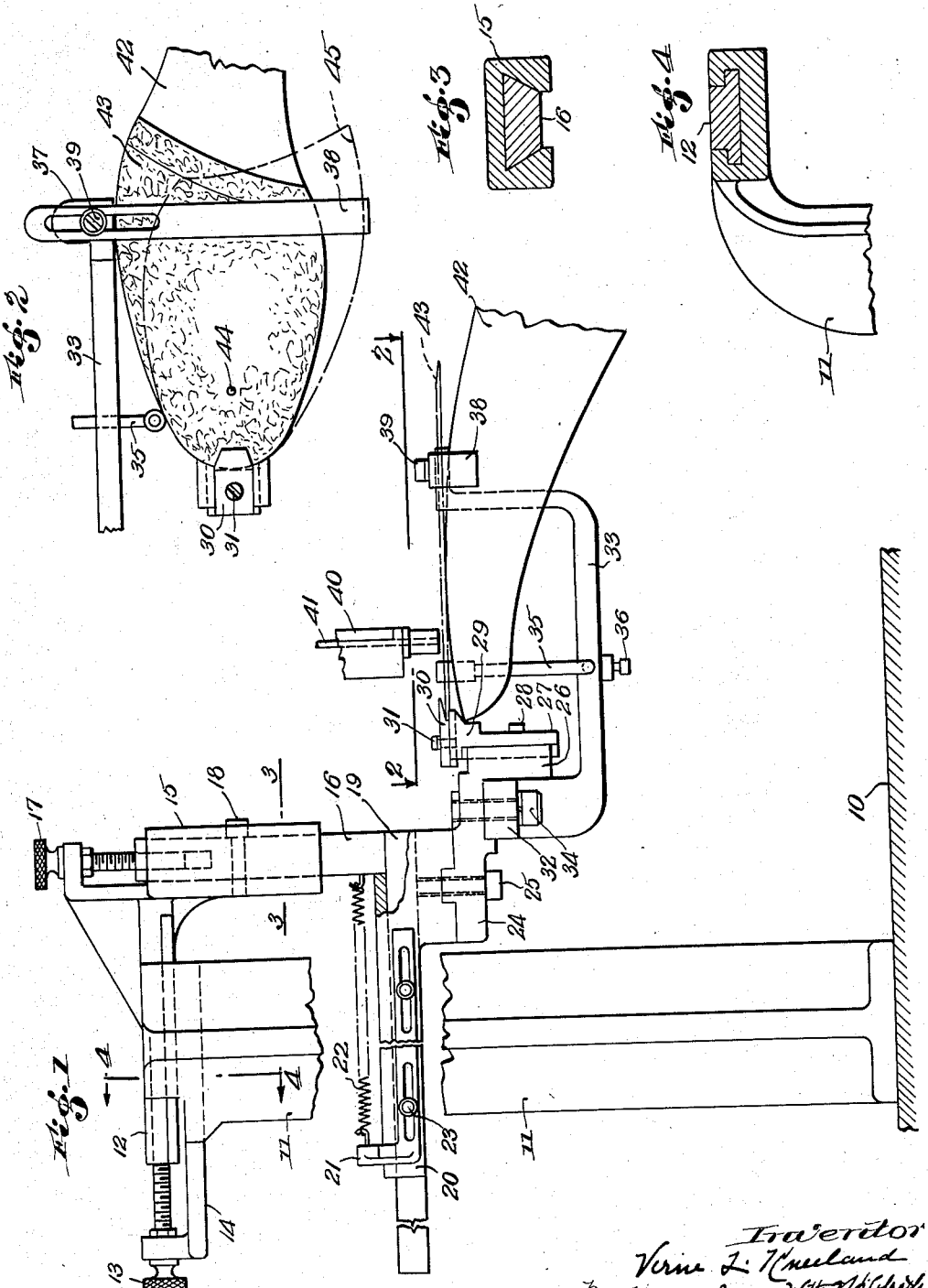

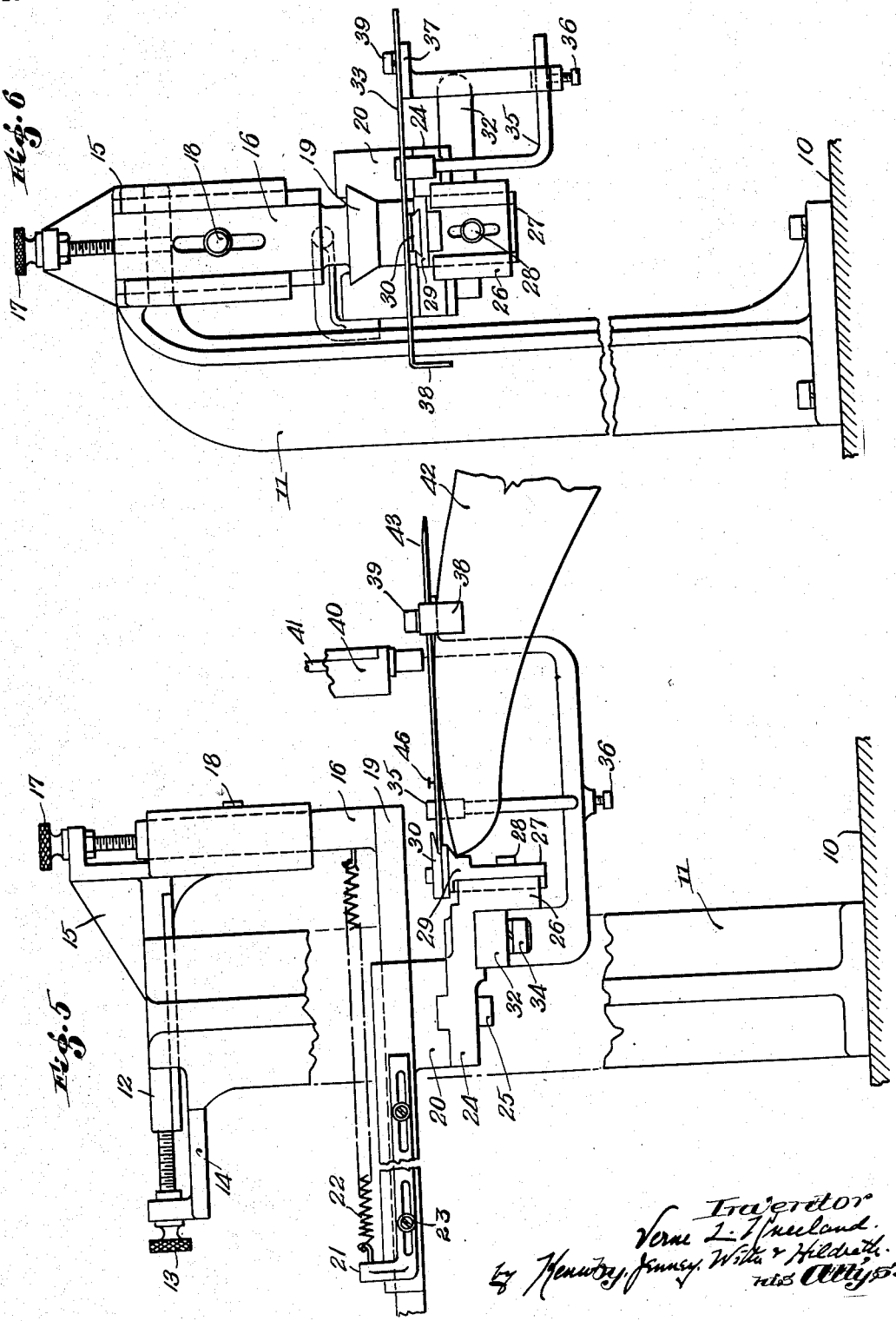

2,538,252

UNITED STATES PATENT OFFICE 2,538,252

LAST AND INSOLE GAUGING MECHANISM

Verne L. Kneeland, Manchester, N. H.

Application March 3, 1949, Serial No. 79,388

5 Claims. (Cl. 12—19.2)

This invention comprises a new and improved gauging mechanism for locating an insole and last properly with respect to each other and to a tool for performing an operation on the work so located. While not limited thereto, an important field of use of the invention is in connection with insole tacking machines where it is desired first to locate an insole accurately in conformity to the contour of the last, and then locate these assembled elements accurately in line with a tack nozzle and driver.

With these objects in view an important feature of the invention comprises gauges disposed one above the other for locating the toe of a last and the toe of an insole, in combination with a tip line gauge or gauges arranged to contact with the last and insole at one side in approximately the location of the tip line, or slightly in advance thereof. Preferably and as herein shown, these gauges are mounted in a carriage which is movable longitudinally of the last in a path beneath the tack nozzle so that the operator may establish the proper relation of last and insole and then move them in superposed relation to bring beneath the tack nozzle the desired point in the insole for a tack, this point being often indicated by a mark previously placed upon the insole in the stock fitting operations.

Preferably I employ in combination with the toe and tip line gauges of my improved mechanism a ball line gauge constructed and arranged to engage either a right or left hand last as the case may be, thus providing a three-point engagement of the last which positively determines its position with great accuracy. The separate gauges are each individually adjustable so that the mechanism may be set up and arranged to handle the last and insole of any style of shoe. Further, as herein shown, the collective gauges are mounted on a carrier which advances them in convenient location for the operator in presenting the work, and then permits the accurately gauged work to be advanced in a predetermined path to the operating point.

These and other features of the invention will be best understood and appreciated from the following description of a preferred embodiment thereof, selected for purposes of illustration and shown in the accompanying drawings in which:

Figs. 1 and 5 are views of the gauge mechanism in side elevation showing the carriage in two different positions, Fig. 2 is a fragmentary plan view showing a last and insole in relation to the individual gauges, Fig. 3 is a sectional view on the line 3—3 of Fig. 1.

Fig. 4 is a sectional view on the line 4—4 of Fig. 1, and

Fig. 6 is a view of the gauge mechanism in front elevation.

In the drawings the gauge mechanism is shown as supported upon the table 10 of an insole tacker of which the tack nozzle 40 and driver 41 are also shown. These determine the operative point of the machine where the tack is to be driven and in line with which the selected point of the insole must be presented.

The gauging mechanism is carried by a post 11 which may be bolted to the table 10 and which includes an overhanging top having a horizontal guideway in which is mounted a cross slide 12. The position of the cross slide may be regulated by an adjusting screw 13 which is threaded into the slide and supported by an arm 14 projecting rearwardly from the post 11. In the cross slide 12 is mounted a carriage 15 having a vertical guideway for a slide 16. This, in turn, may be adjusted vertically by an adjusting screw 17 threaded into the slide and mounted in an arm of the carriage 15. A clamping screw 18 passes through a slot in the slide 16 and serves to clamp the slide in adjusted position at the desired height.

The slide 16 is provided at its lower end with a rearwardly extending arm 19 and upon this is mounted a carriage 20. An angular bracket 21 is adjustably secured at one side of the carriage 20 by screws 23, and is provided with a hook to which is connected the rear end of a tension spring 22. The forward end of the spring is connected to a hook projecting from the rear side of the slide 16 and the spring tends at all times to move the carriage 20 forwardly to locate the gauges in position for the presentation of the work. It will be apparent that the tension of the spring 22 may be regulated by adjusting the position of the bracket 21 upon its carriage 20. The forward position of the carriage 20 and the gauges carried thereby is determined by the engagement of the carriage with the rear face of the slide 16 as shown in Fig. 1.

Secured to the carriage 20 by a screw 25 is a bracket 24 having a downwardly extending arm 26 in which is formed a vertical guideway. A slide 27 is adjustable in this guideway and is slotted to receive an adjusting screw 28 by which it may be clamped in any position of vertical adjustment. The slide 27 carries at its upper end the last toe gauge 29 and to the top of the slide is secured the insole toe gauge 30 by means of a clamping screw 31. These two toe gauges are located directly one above the other but are spaced to accommodate the slight divergence of the flat insole from the curved last bottom as indicated in Fig. 1.

To the bracket 24 is also secured by means of a screw 34 the horizontal arm 32 of an angular bracket which includes a forwardly extending U-shaped arm 33. An edge gauge 35 is adjustably secured to the flat portion of the arm 33 by a clamping screw 36. The gauge 35 at its upper end is elongated vertically and may include a roller supplying contact surface both with the insole and the side of the last. The outer arm of the bracket 33 extends upwardly and is provided in its upper end with a horizontal guideway 37 for a ball line gauge 38. This is slotted and provided with a clamping screw 39 for purposes of adjustment. It is turned down at its outer end in hook formation as shown in Fig. 1 so that it is properly positioned to engage the outer side of a right last 45 when presented in inverted position as indicated in broken lines in Fig. 2. The outer arm of the U-shaped bracket 33 itself provides a gauge surface for contact with the side of a left last 42 as indicated in full lines in Fig. 2.

From the foregoing description it will be apparent that the gauge mechanism is represented in Fig. 1 in its forward position in readiness to have a last and insole presented thereto. Assuming that the individual gauges have been properly adjusted for the style of shoe being manufactured and that the operator desires to insert a tack at the point 44 in an insole 43 located upon the last 42, the operation proceeds as follows. The toe of the last is first brought into engagement with the toe gauge 29 and positioned laterally by engagement with the tip line gauge 35. At the same time it is swung into engagement with the ball line gauge provided by the outer arm of the U-shaped bracket 33 and thus located accurately by three-point engagement. Meanwhile the insole, or an insole piece 43, which has been marked for the location of the tack, has been placed upon the bottom of the last and is now pushed forwardly into engagement with the insole toe gauge 30, the edge or tip line gauge 35, and the ball line gauge of the bracket 33, so that it is located in accurate engagement with the contour of the underlying last bottom. With the work thus located, the operator presses forwardly upon the last thus moving the gauged work until the point 44 is located directly under the nozzle 40. The clutch of the tacking machine is then tripped and the tack 46 is driven in exactly the desired predetermined point. The range of movement of the carriage 20 is sufficient to permit the work to be advanced still further if desired so that one or more additional tacks may be driven through the insole at points nearer to the ball line if desired.

Having thus disclosed my invention and described in detail an illustrative embodiment thereof, I claim as new and desire to secure by Letters Patent:

1. Gauging mechanism for a last and insole, comprising a carriage movable longitudinally of the last from an initial predetermined position, and a toe gauge, a tip line gauge and a ball line gauge all mounted for individual adjustment upon said carriage and movable therewith in fixed relation in response to pressure exerted against the said toe gauge.

2. Gauging mechanism for a last and insole, comprising a carriage movable longitudinally of a last from a fixed initial position and having a toe gauge disposed in alignment with its path of movement, a tip line gauge mounted in the carriage to the rear and at one side of the toe gauge, and a ball line gauge mounted to the rear of the tip line gauge and having spaced contact faces for engaging the side of either a right or left last as the same is presented to the toe gauge.

3. In an insole tacking machine having a vertical tack nozzle and driver operating in a fixed location, a carriage movable in a horizontal path in line with the nozzle and having toe end gauges for a last and insole, a tip line gauge having a vertically elongated contact face movable with said carriage, and a ball line gauge located at a predetermined distance to the rear of the tip line gauge for gauging the last and a superposed insole at approximately the ball line of the last.

4. Gauging mechanism for a last and insole, comprising a standard having a vertically and horizontally adjustable carriage therein, a second horizontally movable carriage mounted in the first carriage, spring means normally urging the latter carriage into an outwardly projecting position while permitting it to be retracted by manual pressure, vertically spaced last and insole toe gauges mounted on the latter carriage, a U-shaped bracket projecting rearwardly from the carriage, a tip line gauge projecting upwardly from said bracket at one side of the toe gauges, and a ball line gauge mounted in the outer arm of said bracket.

5. In an insole tacking machine having a vertical tack nozzle and driver operating in a fixed location, a carriage mounted for movement in a horizontal path beneath the nozzle, a toe end gauge for a last and a toe end gauge for an insole adjustably mounted, one above the other, in the carriage, an edge gauge also adjustably mounted in the carriage, a stop, and spring means for holding the carriage against the stop while permitting it to be advanced by pressure exerted through the last upon the lower of the toe end gauges.

VERNE L. KNEELAND.

REFERENCES CITED

The following references are of record in the file of this patent:

UNITED STATES PATENTS

| Number | Name | Date |
|---|---|---|
| 234,167 | Brock and Woodward | Nov. 9, 1880 |